March 14, 1933.  I. E. McCABE  1,901,402
MOTOR OPERATED MECHANISM
Filed Feb. 11, 1932   4 Sheets-Sheet 1

INVENTOR
IRA E. McCABE
BY
ATTORNEY

March 14, 1933.  I. E. McCABE  1,901,402
MOTOR OPERATED MECHANISM
Filed Feb. 11, 1932  4 Sheets-Sheet 2

INVENTOR
IRA E. McCABE
BY Langdon Moore
ATTORNEY

March 14, 1933.　　　I. E. McCABE　　　1,901,402

MOTOR OPERATED MECHANISM

Filed Feb. 11, 1932　　　4 Sheets-Sheet 3

INVENTOR
IRA E. McCABE
BY Langson Moon
ATTORNEY

March 14, 1933.   I. E. McCABE   1,901,402
MOTOR OPERATED MECHANISM
Filed Feb. 11, 1932    4 Sheets-Sheet 4
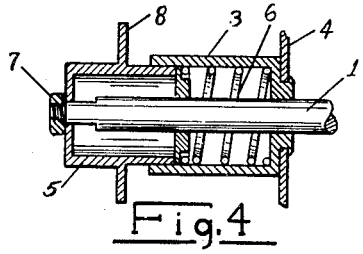
Fig. 4
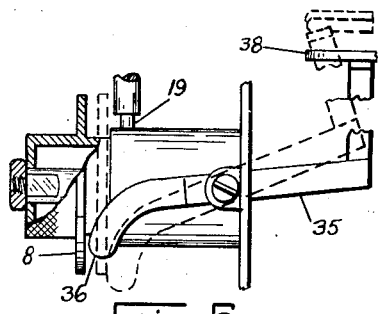
Fig. 5
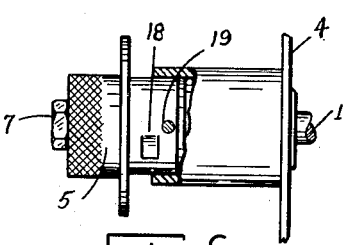
Fig. 6
Fig. 8
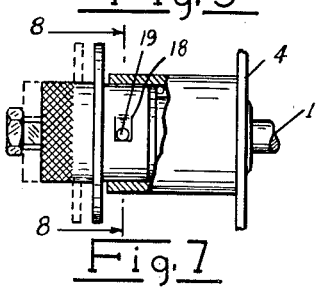
Fig. 7
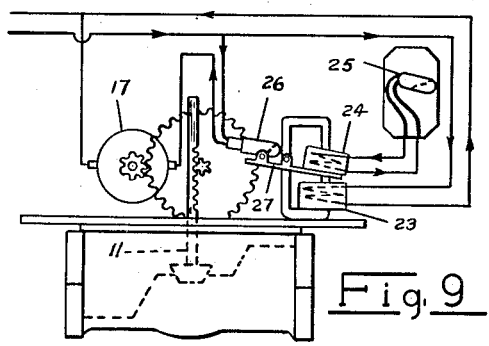
Fig. 9
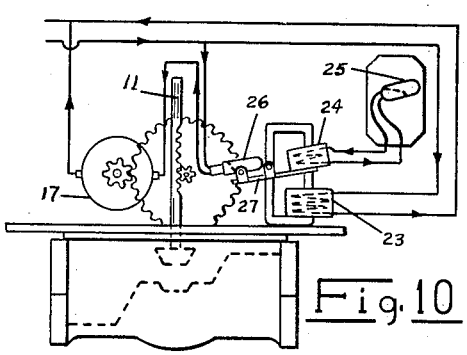
Fig. 10
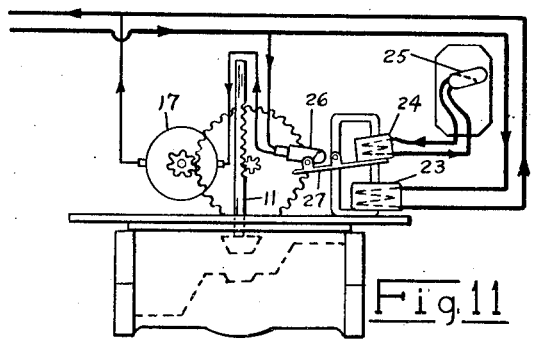
Fig. 11
INVENTOR
IRA E. McCABE
BY
ATTORNEY Patented Mar. 14, 1933

1,901,402

UNITED STATES PATENT OFFICE

IRA E. McCABE, OF CHICAGO, ILLINOIS

MOTOR OPERATED MECHANISM

Application filed February 11, 1932. Serial No. 592,219.

This invention relates to improvements in electric motor operated mechanism for imparting positive movement in one direction to a movable member and allow of an automatic return to normal at a controlled time thereafter adapted to initiate the operation of valves, dampers, switches, door latches and the like.

It is an object of this invention to provide a mechanism of this type which may be controlled by a switch adjacent thereto or by a distant control such as a thermostat, which is simple in construction and which may be manually operated if the electric current fails to operate the mechanism and further when manually operated to place the parts in position to be thereafter responsive to the control switch should the current come on while the parts are in the manually operated position.

It is also an object of this invention to provide a mechanism employing enclosed electric switches to avoid the possibility of arcing igniting an inflammable or explosive gas when employed to operate valves or dampers. It is a further object of this invention to control the operation of this mechanism either by the commercial electric current or by the employment of a current of lesser strength when desired.

With these and other objects in view, reference is made to the accompanying sheets of drawings in which an embodiment of this invention is illustrated as applied to the operation of a valve with the understanding that minor detail changes may be made without departing from the scope thereof, and that its many uses are not limited to this particular embodiment.

In the drawings—

Figure 4 is a view in longitudinal vertical section taken through the center of the manual operating knob, with the operating shaft in side elevation.

Figure 5 is a view in side elevation of the manual operating knob, with parts broken away, and the associated lifting lever, showing the position assumed by the parts, in dotted lines, when the mechanism has been manually operated.

Figure 6 is a top plan view, with parts broken away, showing the position assumed by the parts associated with the knob upon normal electrical operation.

Figure 7 is a similar view illustrating the cooperation of the associated parts upon manual operation.

Figure 8 is a view in vertical transverse section taken on the line 8—8 of Figure 7.

Figure 9 is a wiring diagram illustrating the operating parts in idle position with the valve closed.

Figure 10 is a similar view showing the position assumed by the operating parts upon manual operation to open the valve.

Figure 11 is a view similar to Figure 9 showing the position assumed by the operating parts after normal electrical operation to open the valve and responsive to the thermostatic control.

Figure 1:
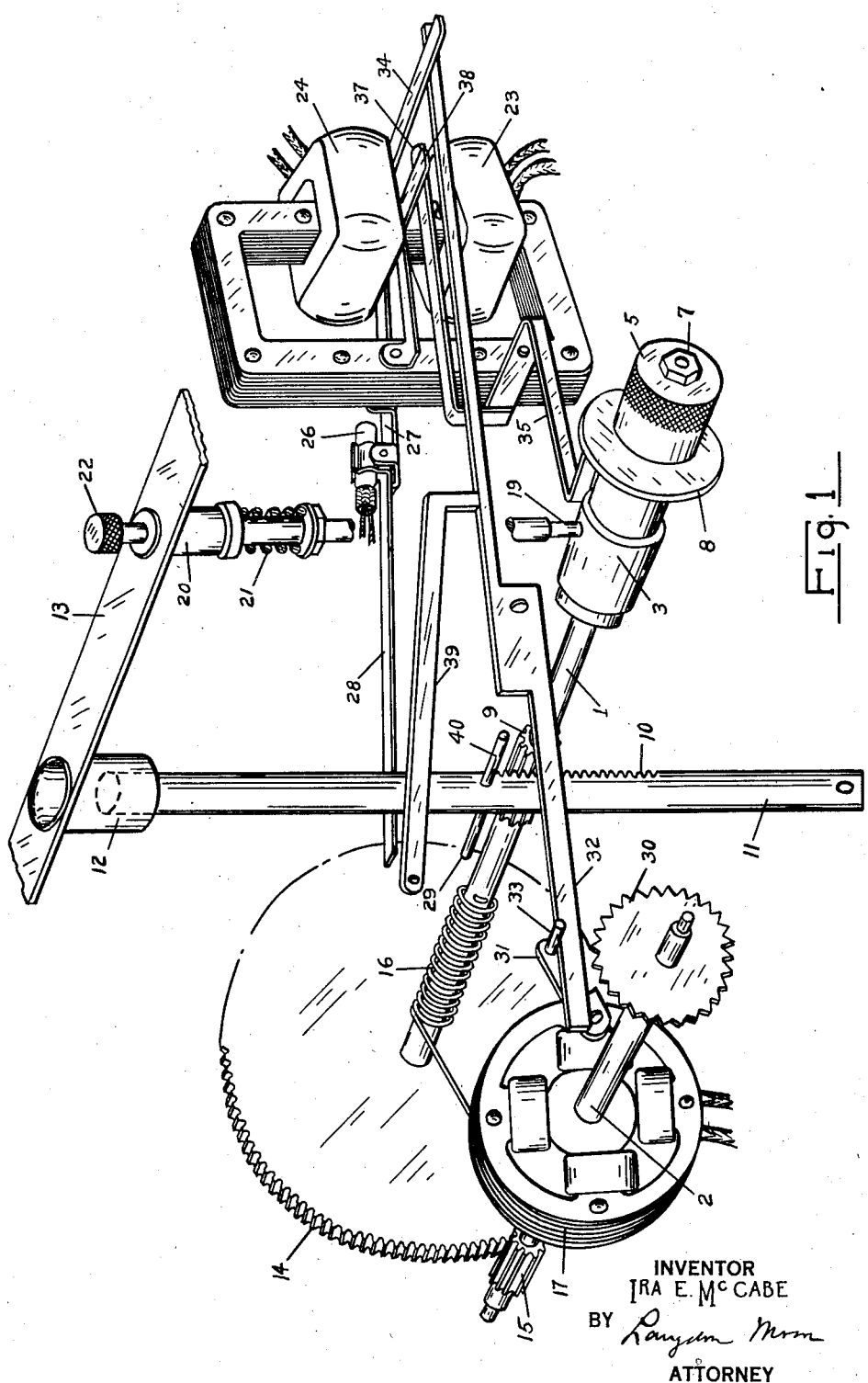
Figure 1 is a view in perspective of an embodiment of this invention, with the casing removed and parts broken away, illustrating the parts in idle position after the valve has been closed.
Figure 2:
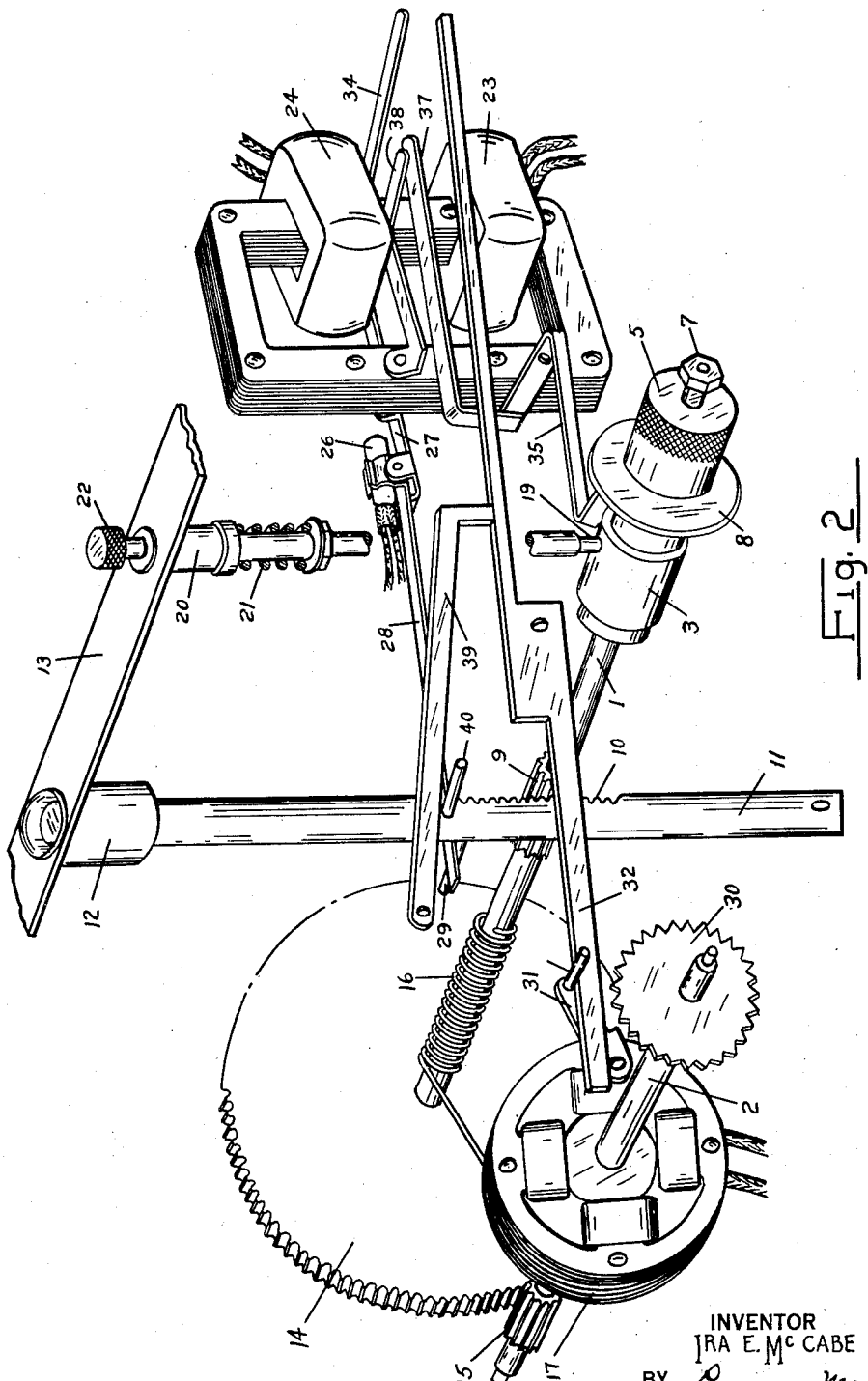
Figure 2 is a similar view illustrating the position of the parts after having been operated by hand to open position.
Figure 3:
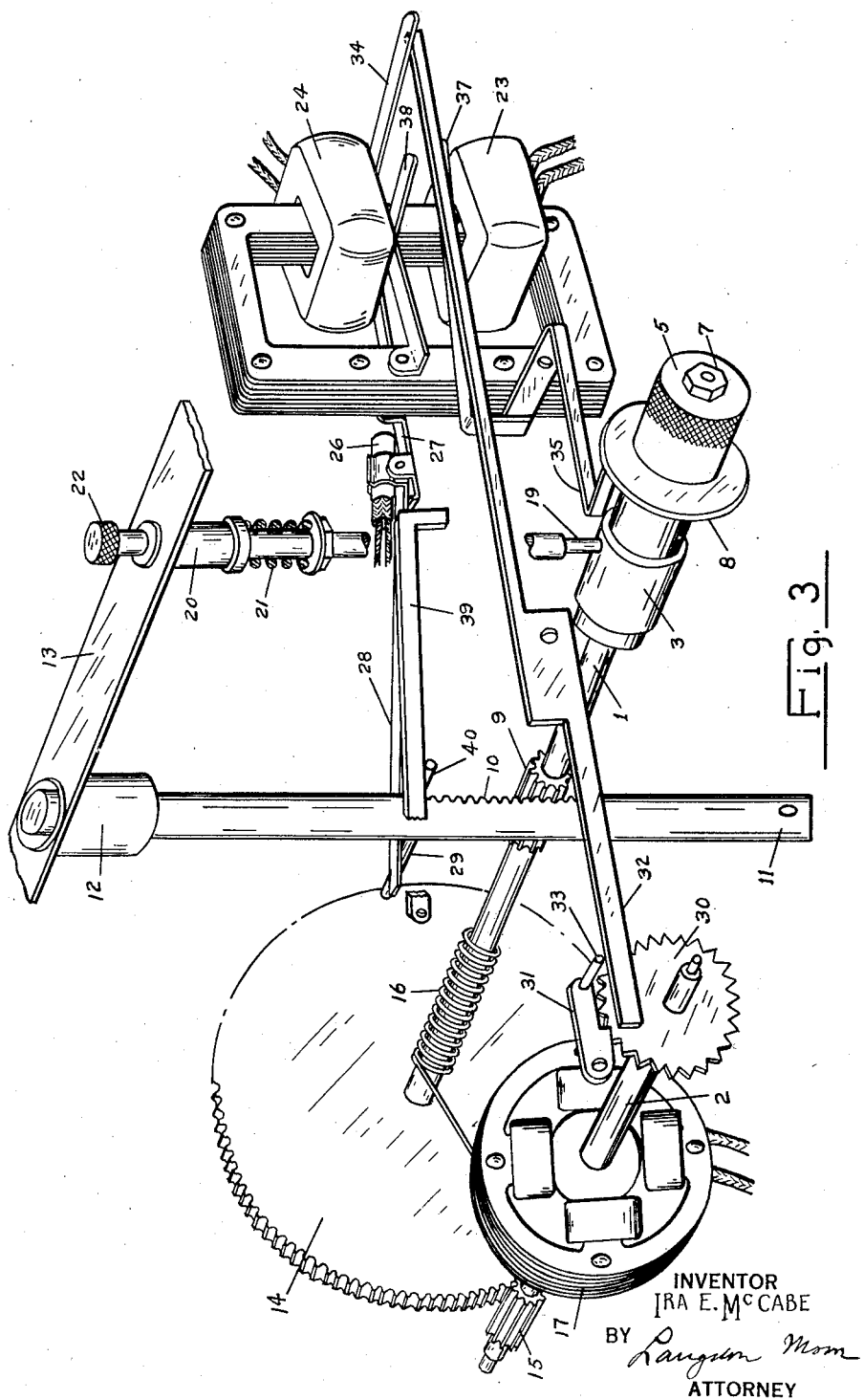
Figure 3 is a view similar to Figure 1 illustrating the position of the parts after having been operated by the electric current to open position and thereafter responsive to the thermostatic control.

Figures 1, 2 and 3 illustrate an embodiment of this invention as applied to the thermostatic control for operating a valve, with the casing removed to afford an unobstructed illustration of the operating parts, the only function of the casing being the provision of a cover therefor and to provide bearings for certain parts including an operating shaft 1 and a parallel motor shaft 2, one end of the operating shaft 1 mounted in a sleeved bearing 3 carried on the exterior of the front plate 4, Fig. 4 of the casing through which that end of the shaft passes and to which end a manually operating knob 5 is keyed and adapted for longitudinal reciprocation upon the shaft. The knob 5 is cylindrical in form adapted to be received within the sleeve of the bearing 3 with a compression spring 6 within said sleeve normally maintaining the knob 5 in contact with a stop or nut 7 on the outer end of the operating shaft 1 and having an intermediate outstanding annular flange 8 to limit the inward movement of the knob when serving as actuating means for the relay, as hereinafter described, and manually depressed against the action of the spring 6.

The operating shaft 1 mounts a pinion 9 adapted to engage with a rack 10 upon an actuating connecting rod 11 mounted for reciprocation in a bearing 12 carried on a plate 13 secured to the top of the casing, which rod is adapted to be connected to the valve to actuate the same. The operating shaft 1 also mounts a large gear wheel 14 meshing with a gear 15 upon the motor shaft 2. The transmitting of power from motor to shaft may be accomplished as shown or by chain or belt drive or any desirable means and is arranged to supply the necessary power and travel required. One end of a torsion spring 16 is secured to the shaft 1 about which the coils of the spiral are wrapped with the other end secured to some fixed part on the casing of the electric motor 17 for driving the motor shaft 2. The actuating rod 11 may be connected in any desired manner to open and close a damper or valve. In Figures 9, 10 and 11 the actuating rod 11 is shown as the valve stem. The spring 16 is so adjusted that as the rod 11 is moved in one direction it stores up force to assist in the return of the rod to its original position after the moving force has been removed. The weight of the parts operated and action of springs in said parts all tend to return the control mechanism to its idle position.

Assume that in the position of the actuating rod shown in Figure 1 the valve controlled thereby is closed, the manual rotation of the knob 5 in a clockwise direction will cause the pinion on the shaft 1 to lift the rod 11 and at the same time wind up the spring 16, so that upon release of the knob 5, the spring 16 would recoil to close the valve unless the parts are locked in the open position. This is accomplished by the depression of the knob 5 before manual operation which brings a catch depression 18, Fig. 6, in the cylindrical surface of the knob 5 in line with the end of a pin 19 passing through the bearing sleeve 3 and mounted for reciprocation in a bearing 20, preferably mounted on the plate 13, and having a spring 21 normally exerting a tension on the pin in the direction of the knob and preferably provided with a lifting head 22 upon the exterior of the casing.

The catch is so positioned that upon depression of the knob 5, it is brought into alignment with the pin 19 and upon sufficient rotation the pin will engage the catch to prevent counter rotation of the shaft 1 until manually released by an up pull on the head 22. It is to be noted here that when the shaft 1 has been manually operated to open the valve, it is capable of a further rotation in engagement with the rod to impart a further movement to the actuating rod 11 for a purpose hereinafter described.

In order to control the operation of the valve automatically by thermostatic means the primary coil 23 of a transformer relay of the repulsion type, such as disclosed in applicant's prior copending applications Serial No. 500,747 filed December 8, 1930 and Serial No. 508,185 filed January 12, 1931 is connected in the commercial electric line, with the movable secondary coil 24 connected in circuit with a commercial thermostatic control switch 25, so that when the thermostat 25 is open the secondary coil 24 rests upon the primary coil 23 and when the thermostat closes, the secondary circuit is completed and upon energization of the secondary coil it will be repelled to move away from the primary coil 23 and remains so until the secondary circuit is opened.

The electric motor 17 is also connected in the commercial electric line and its circuit is controlled by a motor switch 26 mounted to be actuated by the movement of the secondary coil 24 by mounting the switch 26 to be operated by a pivoted operating arm 27 which has one end secured to the secondary coil, so that the motor switch remains open when the deenergized secondary coil 24 rests upon the primary coil and arm 27 rotates to close the motor switch 26 when the energized secondary coil is repelled and moves away from the stationary primary coil 23.

It is therefore seen that upon the closing of the thermostat 25, the motor 17 is energized and will continue to rotate the operating shaft 1 through gears 15 and 14 and therefore provision is made to open the motor circuit when the actuating rod 11 has opened the valve and also to lock the operating shaft 1 against counter revolution when the motor 17 becomes idle. This is accomplished by providing a motor switch lever 28 which carries the motor switch 26, pivotally mounted upon and normally carried as an extension of the motor switch operating arm 27, the free end of which is adapted to be engaged by an actuating pin 29 projecting in line therewith from the actuating rod 11, so that as the rod approaches the upward end of its travel, the pin 29 engages and lifts the motor switch lever 28 to open the motor switch, as shown in Figure 3. To prevent counter rotation of the operating shaft 1 and likewise counter rotation of the motor shaft 2 after the valve has been opened, the motor shaft 2 is provided with a keyed ratchet wheel 30 adapted to be engaged by a pivoted pawl 31, preferably mounted upon the casing, before the pin 29 actuates the opening of motor switch 26. Also mounted upon the casing is an arm 32 having one end extending under an extension 34 of a pivoted bracket secured to the secondary coil 24, and the other end engaging the underside of the pawl pin 33. When the secondary coil is deenergized or rests in the idle position its weight depresses the one end of the arm 32, so that the other end of the arm lifts the pawl 31 out of engagement with the ratchet wheel 30. Since the pin 19 prevents counter rotation of the shaft 1 when the valve is manually opened and affords means for releasing the parts to return the valve to closed position it is necessary that the pawl does not engage the ratchet wheel to prevent manual closing of the valve when desired. For this purpose a weighted lever 39 is pivoted upon the casing to engage and prevent the normally depressed end from rising whenever the secondary coil 24 is placed in the repelled position. However, when the valve is operated by the thermostat and the secondary coil is repelled to free the depressed end of the arm 32 and the motor switch 26 is closed to energize the motor, provision is made to allow the pawl 31 to fall into the ratchet wheel before the motor switch is tilted by pin 29 to open the motor circuit. This is accomplished by mounting a pin 40 on the actuating rod 11 just above pin 29 and adapted to engage the underside of the weighted lever 39. The location of the pin 40 is such that only upon operation of the motor is sufficient movement imparted to the rod 11 to cause the pin 40 to lift the lever 39 and allow the heavier end of arm 32 to rotate and permit the pawl 31 to drop into the ratchet wheel and prevent counter rotation of the motor shaft until desired.

When the valve has been opened by the thermostat it can be closed only by interruption of the current to the transformer which deenergizes the coils, causes the secondary coil 24 to fall and the bracket extension 34 depresses the end of the arm 32 beneath it to cause the lifting of the pawl out of engagement with the ratchet, whereby the parts are freed to return the valve to closed position.

In order to manually operate the valve if there is no commercial current and place the parts above described in the proper position to resume thermostatic control should the current resume, means is provided to raise the deenergized secondary coil 24 upon the depression of the knob 5 which includes a pivoted actuator 35 having one end 36 positioned to be engaged and rotated by the flange 8 of the knob 5 to impart a rotating and lifting motion to an extension 37 to engage and lift a projection 38 of the pivoted bracket 34 to which is secured the coil 24 and then lift said coil to allow the motor switch 26 to close.

As heretofore said when manually operated to open the valve, the actuating rod 11 is not moved to the maximum upward end of its travel, its movement ceasing before the lever 39 is lifted and before the motor 26 is opened, so that upon resumption of the current the motor 17 rotates the shaft 1 imparting additional movement to the rod 11 to cause pin 40 to lift lever 39 and cause the engagement of pawl 31 with the ratchet wheel 30 and thereafter to cause pin 29 to open the motor switch 26 and at the same time to impart sufficient clockwise motion to the knob 5 to cause the end of pin 19 to ride up out of the catch depression 18 thereon and by the action of the spring 6 move the knob 5 to take the catch 18 out of alignment with the pin 19, whereby counter rotation of the shafts are prevented by the pawl and the valve remains open until the transformer is deenergized whereupon the tension of the spring 16 upon the operating shaft imparts a counterclockwise rotation to return the actuating rod 11 to close the valve.

From the above it is obvious that this invention provides a very simple mechanism of the class described which is adapted to be connected in the commercial home lighting circuit and employs but two switches, one for the motor and one for the control. These switches may be manually or automatically operated. The automatic operating means may include a time or temperature responsive switch, as desired.

What I claim is:

1. A motor operated mechanism of the character described including an electric motor, an electric circuit therefore, an actuating rod, means operated by the motor to impart axial movement to the rod in one direction and means to impart opposite axial movement thereafter when the motor circuit is broken, a relay having a movable coil, a circuit therefore, a relay energizing switch in said circuit, a switch in the motor circuit, means actuated by the closing of the energizing switch to cause the movement of the movable coil to close the motor switch, means for opening the closed motor switch actuated by a predetermined movement of the actuating rod, and means for holding the rod against movement in the opposite direction, said holding means active only as long as the relay remains energized following the opening of the motor switch by the movement of the actuating rod.

2. A motor operated mechanism including an electric motor, an electric circuit therefore, an actuating rod, means operated by the motor to impart axial movement to the rod in one direction and means to impart opposite axial movement thereafter when the motor circuit is broken, a repulsion type transformer relay having its primary coil stationary and connected in parallel with the motor circuit and its movable secondary coil in circuit with a control switch, a switch in the motor circuit, means actuated by the movement of the secondary coil when energized to close said motor switch, means actuated by a predetermined movement of actuating rod to open the motor switch, and means adapted to hold the actuating rod against movement in the opposite direction as long as both coils are energized.

3. A motor operated mechanism including an electric motor, an electric circuit therefore, an actuating rod, means operated by the motor to impart axial movement to the rod in one direction and means to impart opposite axial movement thereafter when the motor circuit is broken, a repulsion transformer relay having its primary coil stationary and connected in parallel with the motor circuit and its movable secondary coil in circuit with a control switch, a switch in the motor circuit, means actuated by the movement of the secondary coil when energized to close said motor switch, means actuated by a predetermined movement of actuating rod to open the motor switch, means adapted to hold the actuating rod against movement in the opposite direction when the motor switch is opened, and means to actuate said holding means to free the actuating rod upon deenergizing one or both coils of the transformer.

4. A motor operated mechanism including an electric motor, an electric circuit therefore, an actuating rod, means operated by the motor to impart axial movement to the rod in one direction and means to impart opposite axial movement thereafter when the motor circuit is broken, a repulsion transformer relay having its primary coil stationary and connected in parallel with the motor circuit and its movable secondary coil in circuit with a control switch, a switch in the motor circuit, means actuated by the movement of the secondary coil when energized to close said motor switch, means actuated by a predetermined movement of actuating rod to open the motor switch, means adapted to hold the actuating rod against movement in the opposite direction when the motor switch is opened, and means to actuate said holding means to free the actuating rod upon the deenergization of one or both coils of the transformer operated by the weight of the deenergized secondary coil.

5. A motor operated mechanism including an electric motor, an electric circuit therefore, an actuating rod, means operated by the motor to impart axial movement to the rod in one direction and means to impart opposite axial movement thereafter when the motor circuit is broken, a repulsion transformer relay having its primary coil stationary and connected in parallel with the motor circuit and its movable secondary coil in circuit with a control switch, a switch in the motor circuit, means actuated by the movement of the secondary coil when energized to close said motor switch, means actuated by a predetermined movement of actuating rod to open the motor switch, means adapted to hold the actuating rod against movement in the opposite direction when the motor switch is opened, and means normally maintaining said holding means inactive until the predetermined movement of the rod has been obtained.

6. A motor operated mechanism including an electric motor, an electric circuit therefore, an actuating rod, means operated by the motor to impart axial movement to the rod in one direction and means to impart opposite axial movement thereafter when the motor circuit is broken, a repulsion transformer relay having its primary coil stationary and connected in parallel with the motor circuit and its movable secondary coil in circuit with a control switch, a switch in the motor circuit, means actuated by the movement of the secondary coil when energized to close said motor switch, means actuated by a predetermined movement of actuating rod to open the motor switch, means adapted to hold the actuating rod against movement in the opposite direction when the motor switch is opened, and means normally maintaining said holding means inactive until the predetermined movement of the rod has been obtained and actuated by said movement of the actuating rod by the motor to render said holding means active before the motor switch is opened.

7. An electric motor operated mechanism including an electric circuit, a motor in said circuit, a reciprocable actuating rod, means operated by the motor to move the rod in one direction, means normally tending to move the rod in the opposite direction, a repulsion transformer relay having a stationary primary coil connected in parallel in the motor circuit and a control switch connected in circuit with the movable secondary coil, a switch in the motor circuit, means actuated by the weight of the deenergized secondary coil to open the motor switch and upon movement of the energized secondary coil upon the closing of the thermostatic switch to close the motor switch, means adapted to hold the actuating rod against counter movement upon opening of the motor switch, means actuated by the weight of the deenergized secondary coil to render said holding means inactive and upon movement of the energized secondary coil render said means active, additional means normally adapted to render said holding means inactive when the secondary coil is energized, means for opening the closed motor switch actuated by a predetermined movement of the actuating rod and means actuated by a said movement of the actuating rod to first free the additional means to allow the holding means for the actuating rod to become active, and manual operating means adapted upon cessation of electric current in the motor circuit to lift the dead secondary coil closing the motor switch, impart movement to the valve actuating rod and thereafter hold it against movement in the opposite direction until manually released.

8. An electric motor operated mechanism including an electric circuit, a motor in said circuit, a reciprocable actuating rod, means operated by the motor to move the rod in one direction, means normally tending to move the rod in the opposite direction, a repulsion transformer relay having a stationary primary coil connected in parallel in the motor circuit and a control switch connected in circuit with the movable secondary coil, a switch in the motor circuit, means actuated by the weight of the deenergized secondary coil to open the motor switch and upon movement of the energized secondary coil upon the closing of the control switch to close the motor switch, means adapted to hold the actuating rod against counter movement upon opening of the motor switch, means actuated by the weight of the deenergized secondary coil to render said holding means inactive and upon movement of the energized secondary coil render said means active, additional means normally adapted to render said holding means inactive when the secondary coil is energized, means for opening the closed motor switch actuated by a predetermined movement of the actuating rod and means actuated by a said movement of the actuating rod to first free the additional means to allow the holding means for the actuating rod to become active, manual operating means adapted upon cessation of electric current in the motor circuit to lift the dead secondary coil and close the motor switch, impart movement to the valve actuating rod and including means thereafter to hold it against movement in the opposite direction until manually released, said manual means also operable to free the manual holding means to place the mechanism in control of the electric circuit when said current is resumed in said circuit.

9. An electric motor operated mechanism including an electric circuit, a motor in said circuit, a reciprocable actuating rod, means operated by the motor to move the rod in one direction, means normally tending to move the rod in the opposite direction, a repulsion transformer relay having a stationary primary coil connected in parallel in the motor circuit and a control switch connected in circuit with the movable secondary coil, a switch in the motor circuit, means actuated by the weight of the deenergized secondary coil to open the motor switch and upon movement of the energized secondary coil upon the closing of the control switch to close the motor switch, means adapted to hold the actuating rod against counter movement upon opening of the motor switch, means actuated by the weight of the deenergized secondary coil to render said holding means inactive and upon movement of the energized secondary coil render said means active, additional means normally adapted to render said holding means inactive when the secondary coil is energized, means for opening the closed motor switch actuated by a predetermined movement of the actuating rod and means actuated by a said movement of the actuating rod to first free the additional means to allow the holding means for the actuating rod to become active, and manual operating means adapted upon cessation of electric current in the motor circuit to lift the dead secondary coil, impart movement to the valve actuating rod and render the holding means for the actuating rod active and at the same time closing the motor switch, said manual means also operable to free the manual holding means to place the mechanism in control of the electric circuit when said current is resumed in said circuit.

10. An electric motor operated mechanism including an electric circuit, a motor in said circuit, a reciprocable actuating rod, means operated by the motor to move the rod in one direction, means normally tending to move the rod in the opposite direction, a repulsion transformer relay having a stationary primary coil connected in parallel with the motor circuit and a control switch connected in circuit with the movable secondary coil, a switch in the motor circuit, means actuated by the weight of the deenergized secondary coil to open the motor switch and upon movement of the energized secondary coil upon the closing of the control switch to close the motor switch, means adapted to hold the actuating rod against counter movement upon opening of the motor switch, means actuated by the weight of the deenergized secondary coil to render said holding means inactive and upon movement of the energized secondary coil render said means active, additional means normally adapted to render said holding means inactive when the secondary coil is energized, means for opening the closed motor switch actuated by a predetermined movement of the actuating rod and means actuated by a said movement of the actuating rod to first free the additional means to allow the holding means for the actuating rod to become active, manual operating means adapted upon cessation of electric current to close the motor switch and at the same time to lift the dead secondary coil, impart movement to the valve actuating rod and thereafter hold it against movement in the opposite direction until manually released, said actuating rod capable of further movement in the direction of the manual operation whereby upon reoccurrence of the electric current regardless of the position of the control switch the motor completes the movement of the actuating rod to render the manual operating holding means inactive and the first said holding means active and open the motor switch and thereafter the movement of said rod is controlled by the energizing of the transformer.

IRA E. McCABE.